M. SLEETH.
WIRE BENDING MACHINE.
APPLICATION FILED SEPT. 12, 1914.
1,165,293. Patented Dec. 21, 1915.
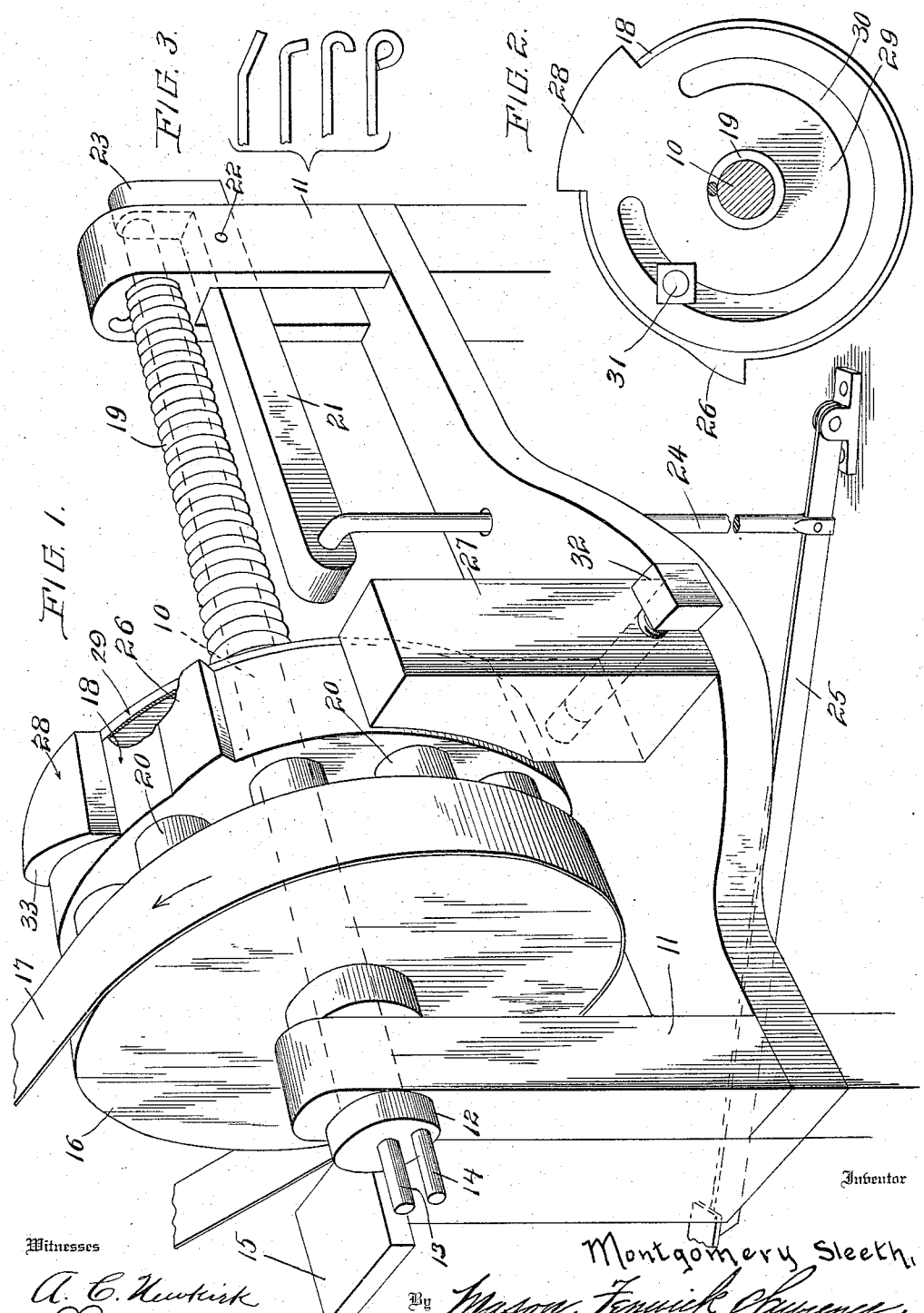

UNITED STATES PATENT OFFICE.

MONTGOMERY SLEETH, OF PITTSBURGH, PENNSYLVANIA.

WIRE-BENDING MACHINE.

1,165,293.   Specification of Letters Patent.   Patented Dec. 21, 1915.

Application filed September 12, 1914. Serial No. 861,417.

*To all whom it may concern:*

Be it known that I, MONTGOMERY SLEETH, a citizen of the United States, residing at Pittsburgh, in the county of Allegheny and State of Pennsylvania, have invented certain new and useful Improvements in Wire-Bending Machines; and I do hereby declare the following to be a full, clear, and exact description of the invention, such as will enable others skilled in the art to which it appertains to make and use the same.

This invention relates to wire bending machines and has for an object to provide a machine embodying the usual and ordinary type of wire bending members with new and improved means for operating such members by power.

A further object of the invention is to provide a shaft having the usual and ordinary wire benders carried upon the end thereof, with a pulley loosely mounted thereon and constantly driven, and means to at times manually connect the shaft to the driven pulley to drive the shaft a predetermined distance, with means for disconnecting such shaft and pulley at the completion of such predetermined arc of rotation and returning the shaft and benders to normal position.

With these and other objects in view the invention comprises certain novel constructions, combinations and arrangement of parts as will be hereinafter more fully described and claimed.

In the drawings: Figure 1 is a view of the machine in perspective seen from the rear. Fig. 2 is a view of the shaft in section and the clutch disk in side elevation. Fig. 3 is a view of some of the forms into which wire may be bent by employing the machine set to rotate different arcs of a complete revolution.

Like characters of reference designate corresponding parts throughout the several views.

The improved wire bending machine which forms the subject matter of this application comprises a shaft 10 journaled in any suitable frame as 11. The shaft 10 carries a disk 12 with wire bending members 13 and 14 of substantially the usual and ordinary type, the member 13 being concentric with the shaft and the member 14 being eccentric thereto. Adjacent the shaft a table 15 is mounted upon which the wire is laid and introduced between the members 13 and 14 to be bent.

Upon the shaft 10 a pulley or disk 16 is mounted to rotate independently of the shaft driven in any approved manner as by the belt 17. The belt 17 and pulley 16 are constantly driven but do not affect the rotation of the shaft unless manual means is employed to connect the shaft and pulley. The means employed includes a disk 18 rigidly secured to the shaft 10, and a helical spring 19 surrounding the shaft and having its opposite ends secured respectively to the disk 18 and to the frame 11 as shown more particularly at Fig. 1. The disk 18 carries a plurality of friction members 20 which are preferably though not necessarily wooden plugs inserted in openings in such disk 18 and which bear against the disk 16.

A lever 21 is fulcrumed to the frame at 22 and is provided with an arm 23 bearing against the end of the shaft 10. The lever 21 is controlled by a link 24 extending downwardly to a foot pedal 25 so that as the pedal 25 is depressed the shaft 10 is moved longitudinally to force the friction members 20 carried by the disk 18 into engagement with the disk 16 and the latter will then rotate the shaft 10 and therewith the bending members 13 and 14. The spring 19 being connected at one end to the disk 18 and at the opposite end to the frame 11 it is obvious that it will be expanded when the disk is moved away from the frame and it will be coiled a little more closely when the disk is rotated—both actions putting the spring under tension. Therefore, when the engagement between the friction members 20 and the disk 16 is released the spring will tend to return the disk 18 to normal. The normal position of the disk 18 is determined by a lug 26 formed upon the disk 18 which engages a block 27. The disk 18 is also provided with a movable lug 28 adjustable circumferentially of the disk in any approved manner, as attaching such lug to a disk 29 provided with a slot 30 as shown at Fig. 2 and having a bolt and nut 31 whereby the position of the lug 28 relative to the lug 26 may be adjusted. At some convenient position as through the block 27 a screw 32 is inserted in position to engage the cam surface 33 of the lug 28 as the disk 18 rotates to thereby force the disk 18 away from the disk 16 and prevent further rotation.

In operation, therefore, the lug 26 is normally in engagement with the block 27 and the wire to be bent is laid upon the table 15 and inserted between the bending members 13 and 14. The pedal 25 is then depressed which moves the shaft 10 longitudinally to throw the friction members 20 into engagement with the disk 16 and rotate the disk 18 and the bending members until the cam surface 33 of the lug 28 comes into engagement with the screw 32 whereby the disk 18 is moved slightly away from the disk 16 to prevent further rotation but still held in sufficient engagement therewith to prevent retroaction of the bending members until the bent wire has been removed from the bending members, when releasing the foot-pedal 25 releases the engagement of the members 20 with the disk 16 entirely and permits the spring 19 to return the disk 18 and shaft 10 to normal position.

I claim:

1. In a wire bending machine, a shaft provided with wire bending members; a pulley rotatable upon the shaft; a disk rigidly mounted upon the shaft; friction members interposed between the disk and the pulley; manual means to move the shaft longitudinally to bring the friction members into gripping action between the disk and the pulley; a permanently fixed stop to limit the movement of the disk in one direction; and an adjustable stop carried by the disk adapted to limit the movement of the disk in the opposite direction.

2. In a wire bending machine, a shaft provided with wire bending members; a pulley rotatable upon the shaft; a disk rigidly mounted upon the shaft; a clutch interposed between the disk and the pulley; manual means to move the shaft longitudinally to bring the clutch into gripping action; a stop and block to limit the rotation of the disk in one direction; a set-screw in said block, and an adjustable stop carried by the disk and having a cam face adapted to strike said screw on the rotation of the disk in the opposite direction.

3. In a wire bending machine, a journaled shaft; wire bending members carried by the shaft; a driving disk loosely mounted upon the shaft; a second disk rigidly mounted upon the shaft, clutch members interposed between the disks; means to manually move the shaft longitudinally to bring into action the clutch members; a spring embracing the shaft and adapted to return the shaft to normal position; a stop carried by the disk adapted to limit the movement of the disk in one direction under the action of the spring; and an adjustable stop carried by the disk adapted to limit the movement of the disk in the opposite direction.

4. In a bending machine, a shaft having bending members, a driving member rotatable upon the shaft, a disk fast on the shaft near said member, clutch elements interposed between the disk and member, and means for moving the shaft longitudinally to bring the clutch elements into action; combined with a second disk adjacent the first loose on the shaft and having a slot concentric with the latter, adjusting devices in the first disk engaging said slot, a stop on said second disk, and a block with which the stop engages to limit the rotation of the disks and shaft, for the purpose set forth.

5. In a wire bending machine, a journaled shaft; bending members carried by the shaft; a driving member rotatable upon the shaft; a disk carried rigidly by the shaft; clutch members interposed between the disk and the driving member; means to move the shaft longitudinally to bring the clutch members into action; a spring embracing the shaft and adapted to return the disk to normal position; a rigidly positioned stop adapted to limit the movement of the disk in one direction; and a cam member carried by the disk adapted to release the clutch members at the end of a predetermined arc of rotation.

6. In a wire bending machine, a shaft journaled in a frame, bending members carried by the shaft, a driving member rotatable upon the shaft, a disk carried rigidly by the shaft, clutch members interposed between the disk and the driving member, means to move the shaft longitudinally to bring the clutch members into action, a coiled spring embracing the shaft and connected with the frame and disk, the spring acting to return the disk to normal position, a stop on the disk adapted to limit the rotation of the disk in one direction, a second disk adjustably mounted on the first, and a cam carried by the second disk adapted to release the clutch members at the end of a predetermined arc of rotation.

In testimony whereof I affix my signature in presence of two witnesses.

MONTGOMERY SLEETH.

Witnesses:
Wm. G. Kerr,
H. E. Wolf.

Copies of this patent may be obtained for five cents each, by addressing the "Commissioner of Patents, Washington, D. C."